March 12, 1929.　　　E. A. BIRCHER　　　1,704,690

COMBINATION CHOPPING BOWL AND CUTTING BOARD

Filed Sept. 10, 1926

Inventor
Eugene A. Bircher
By Frank Keifer
Attorney

Patented Mar. 12, 1929.

1,704,690

UNITED STATES PATENT OFFICE.

EUGENE A. BIRCHER, OF ROCHESTER, NEW YORK.

COMBINATION CHOPPING BOWL AND CUTTING BOARD.

Application filed September 10, 1926. Serial No. 134,652.

The object of this invention is to provide a combination chopping bowl and cutting board in which the top of the chopping bowl forms the base of the cutting board and the face of the cutting board forms a non-tilting base for the chopping bowl.

Another object of this invention is to reinforce the cutting bowl so that it cannot split in checking.

These and other objects of this invention will be fully illustrated in the drawing, described in the specification and pointed out in the claims at the end thereof.

In the accompanying drawing.

In the several figures of the drawing like reference numerals indicate like parts.

The combined chopping bowl and cutting board forming the subject matter of my present invention takes the place of a small chopping bowl in which nuts, fruit, etc., are chopped up. The ordinary bowl is not practical for this purpose because when chopping not directly in the center of the bowl it tilts because of its round or practically round base. The contents are thus very often spilled from the bowl during the chopping operation. In the old form of chopping bowls it has been the practice to make the wall of uniform thickness throughout and curve the outside of the bowl to correspond with the inside curvature thereof. This weakens the bowl especially at the upper edge so that when the bowl is exposed to moisture it begins to check in a very short time forming cracks in the wall of the bowl which extend in many cases a considerable distance from the edge to the inside of the bowl. In many cases it is desirable to chop some or all of the material on a flat chopping or cutting surface either before or after it is chopped in the chopping bowl in which case a separate chopping or cutting board is needed in connection with the old form of chopping bowl.

In the chopping bowl forming the subject matter of my present invention, the bowl is provided with a large flat base making the bowl non-tilting and also providing a flat cutting or chopping board, when the bowl is reversed. The wall of the chopping bowl is partially formed within the solid base and projects only a short distance above it with sufficient reinforcement on the outside to preclude any possibility of a checking of the wall of the bowl.

As illustrated in the figures the bowl is formed in a square block 1 the top of which is reduced into a cylindrical flange 2 forming the upper edge of the bowl. The sides of this flange slopes or curves toward the upper edge so that the thickness of the wall gradually diminishes as it approaches the top of the flange. The flange is thus reinforced and forms a strong edge for the upper end of the bowl. The inside of the bowl is hollowed out into the square block to within a suitable depth and the inwardly curving wall still further increases the upper edge thereof.

The square base of the bowl is made slightly larger than the diameter of the top of the bowl so that no matter at what elevation on the inside of the bowl the chopping knife strikes the wall, the bowl cannot tip or tilt and spill the contents thereof.

Figure 1:
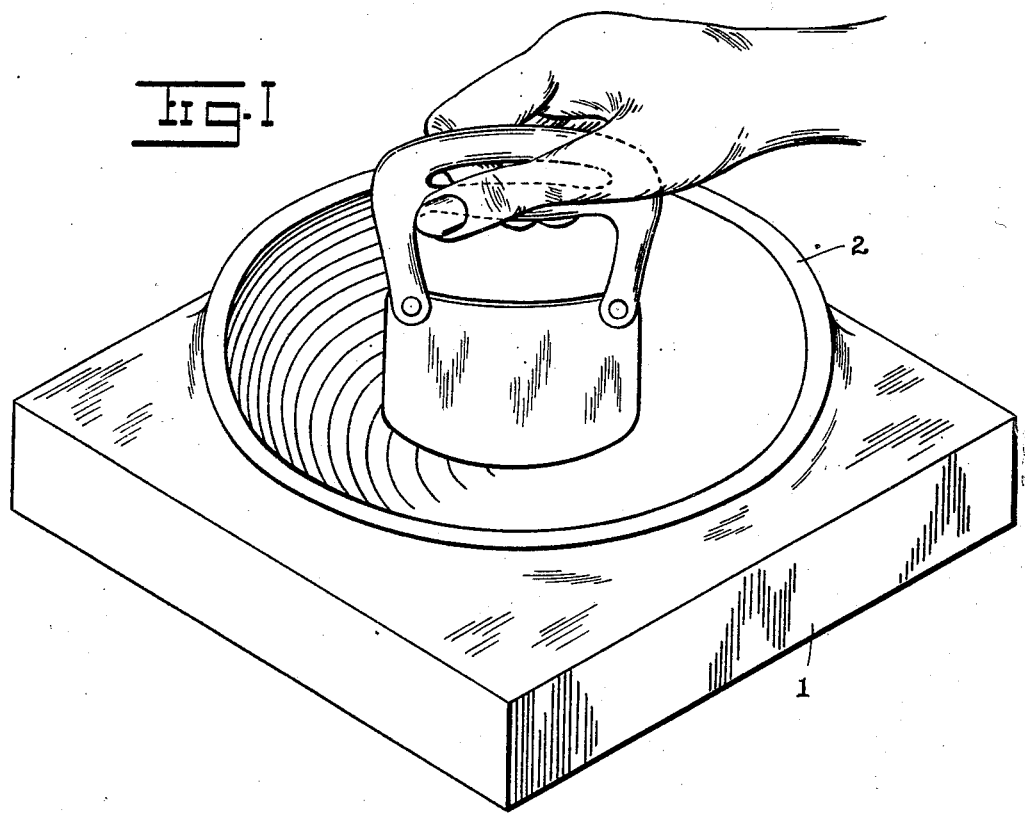
Figure 1 is a perspective view of the chopping bowl with a chopping knife held in place therein ready for chopping.
Figure 2:
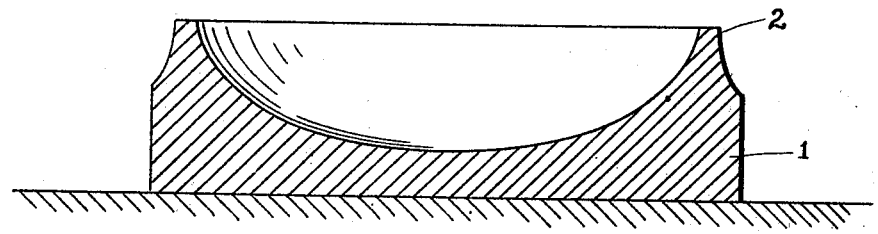
Figure 2 is a vertical cross section of the chopping bowl.
Figure 3:
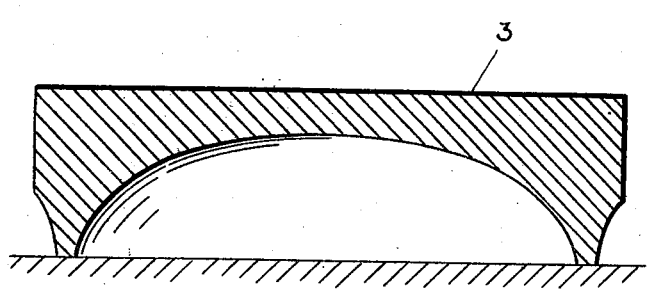
Figure 3 is a similar section with the bowl reversed for use as a cutting board.

The flat square base of the bowl when reversed as illustrated in Figure 3 provides a flat cutting surface 3. For this purpose the upper edge of the bowl is made parallel with the base so that when the bowl is reversed as illustrated in Figure 3 the flat cutting surface 3 is horizontal and is firmly supported by the base formed by the circular edge of the reversed chopping bowl. The fact that the diameter of the upper edge of the bowl is nearly as large as the width and length of the flat cutting surface gives the cutting board a firm and staple base when used as such.

I claim:

1. A combined chopping bowl and cutting board comprising a square block having a square flat surface on the bottom suitable for a cutting board and a circular depression in the top having an outside diameter smaller than the narrowest width of the said square block, a circular flange surrounding said depression and increasing the height thereof above the top of said square block, the block having a square base that is much larger than the circular depression on the top.

2. A combined chopping bowl and cutting board comprising a square block having a square flat surface on the bottom thereof suitable for a cutting board, and a circular concave depression turned in the top thereof having an outside diameter smaller than the narrowest width of the square block, the block having a square base that is much larger than the circular depression on the top and is thick on the edges which base and the angular portion at each of the four corners of the square block on the bowl side of the block being adapted to reinforce the concave surface of the bowl, and the bowl and cutting board being all made from one piece of material.

In testimony whereof I affix my signature.

EUGENE A. BIRCHER.